United States Patent
Foerster et al.

(10) Patent No.: US 10,685,029 B2
(45) Date of Patent: Jun. 16, 2020

(54) INFORMATION RANKING BASED ON PROPERTIES OF A COMPUTING DEVICE

(71) Applicant: Google Inc., Mountain View, CA (US)

(72) Inventors: Jakob Nicolaus Foerster, Oxford (GB); Frederick Peter Brewin, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 443 days.

(21) Appl. No.: 14/949,074

(22) Filed: Nov. 23, 2015

(65) Prior Publication Data

US 2017/0147579 A1 May 25, 2017

(51) Int. Cl.
*G06F 16/2457* (2019.01)
*G06F 16/903* (2019.01)
(Continued)

(52) U.S. Cl.
CPC ...... *G06F 16/24578* (2019.01); *G06F 16/248* (2019.01); *G06F 16/90335* (2019.01); *G06F 16/9535* (2019.01); *G06F 16/9537* (2019.01)

(58) Field of Classification Search
CPC .......... G06F 17/3053; G06F 17/30979; G06F 17/3087; G06F 17/30554; G06F 17/30867;
(Continued)

(56) References Cited

U.S. PATENT DOCUMENTS 5,845,228 A * 12/1998 Uekawa ............. G01C 21/3446
340/990
7,877,402 B1 * 1/2011 Weiss ................. G06F 17/30867
705/14.17
(Continued)

FOREIGN PATENT DOCUMENTS

JP 2014110797 A 6/2014
JP 2016539403 A 12/2016
(Continued)

OTHER PUBLICATIONS

De et al., "Rule-based Reasoning Mechanism for Context-aware Service Presentation," eChallenges, Centre for Communication Systems Research, Oct. 21, 2009, 8 pages.
(Continued)

*Primary Examiner* — Grace Park
*Assistant Examiner* — Hubert Cheung
(74) *Attorney, Agent, or Firm* — Middleton Reutlinger

(57) ABSTRACT

A system is described that, after executing a parameterless search query to identify results that are determined to be relevant to a user of a device, determines a respective target property, for each of the results, that indicates whether a result is associated with audio content, visual content, audio and visual content, haptic content, or textual content. The system also determines one or more dynamic properties, of the device, that indicate one or more of a network connection strength, connection status to an audio output device, battery level, or connection status to a multimedia streaming
(Continued)

device. Based on the one or more dynamic properties of the computing device and the respective target property of each of the results, the system determines a dynamic ranking of the results and transmits the results and the dynamic ranking to the device.

20 Claims, 5 Drawing Sheets

(51) Int. Cl.
  *G06F 16/248* (2019.01)
  *G06F 16/9535* (2019.01)
  *G06F 16/9537* (2019.01)
(58) Field of Classification Search
  CPC ......... G06F 17/30643; G06F 17/30696; G06F 17/30713; G06F 17/30716; G06F 17/30719; G06F 17/30905; G06F 17/30973; G06F 17/30991; G06F 17/30994; G06F 16/24578; G06F 16/248; G06F 16/9535; G06F 16/9537; G06F 16/90335
  See application file for complete search history.

(56) References Cited

U.S. PATENT DOCUMENTS

| | | | | |
|---|---|---|---|---|
| 8,384,726 | B1* | 2/2013 | Grabowski | G06T 15/20 |
| | | | | 345/539 |
| 9,736,681 | B2* | 8/2017 | Fiatal | G06F 17/30905 |
| 10,394,824 | B2* | 8/2019 | Agarwal | G06F 16/24575 |
| 2002/0057297 | A1* | 5/2002 | Grimes | G06F 17/30867 |
| | | | | 715/810 |
| 2004/0044781 | A1* | 3/2004 | Hymel | G06F 17/30867 |
| | | | | 709/229 |
| 2005/0229118 | A1* | 10/2005 | Chiu | G06F 3/0481 |
| | | | | 715/864 |
| 2008/0082490 | A1* | 4/2008 | MacLaurin | G06F 17/30864 |
| 2008/0082782 | A1* | 4/2008 | Meijer | G06F 17/30864 |
| | | | | 711/207 |
| 2008/0104049 | A1* | 5/2008 | Richardson | G06F 17/30864 |
| 2009/0030792 | A1 | 1/2009 | Khivesara et al. | |
| 2009/0086743 | A1* | 4/2009 | Veits | H04L 45/02 |
| | | | | 370/401 |
| 2010/0198842 | A1* | 8/2010 | Giraudon | G06F 17/30106 |
| | | | | 707/754 |
| 2011/0138064 | A1* | 6/2011 | Rieger | G06F 17/30905 |
| | | | | 709/228 |
| 2011/0320470 | A1 | 12/2011 | Williams et al. | |
| 2012/0053829 | A1* | 3/2012 | Agarwal | G01C 21/20 |
| | | | | 701/418 |
| 2013/0212462 | A1* | 8/2013 | Athas | H04L 67/10 |
| | | | | 715/234 |
| 2013/0254812 | A1* | 9/2013 | McCoy | H04N 21/2402 |
| | | | | 725/59 |
| 2014/0196069 | A1* | 7/2014 | Ahmed | H04N 21/4516 |
| | | | | 725/14 |
| 2014/0344266 | A1* | 11/2014 | Bennett | G06F 17/30554 |
| | | | | 707/734 |
| 2015/0254352 | A1* | 9/2015 | Kagan | G06F 3/0482 |
| | | | | 707/722 |

FOREIGN PATENT DOCUMENTS

| | | |
|---|---|---|
| RU | 2383922 C2 | 3/2010 |
| WO | WO9703404 A1 | 1/1997 |

OTHER PUBLICATIONS

Yu et al., "Supporting Context-Aware Media Recommendations for Smart Phones," Pervasive Computing, IEEE CS and IEEE ComSoc, Jul.-Sep. 2006, pp. 68-75.
Klemettinen, "Enabling Technologies for Mobile Services: The MobiLife Book," John Wiley & Sons, Oct. 15, 2007, p. 176.
Bin et al., "Query-adaptive Image Search Re-ranking Using Deep Convolutional Neural Network Feature," 2015 International Conference on Systems, Man, and Cybernetics, Oct. 9, 2015, 6 pp.
International Search Report and Written Opinion of International Application No. PCT/US2016/048664, dated Dec. 5, 2016, 11 pp.
The Korean Intellectual Property Office; Office Action issued in Application No. 10-2018-7011653 dated Feb. 20, 2019.
The Russian Patent Office; Office Action issued in Application No. 2018114072 dated Mar. 27, 2019.
The Japanese Patent Office; Notice of Allowance issued in Appliccation No. 2018-545802 dated May 20, 2019.
The Korean Intellectual Property Office; Notice of Allowance issued in Application No. 10-2018-7011653 dated Aug. 27, 2019.

* cited by examiner

INFORMATION RANKING BASED ON PROPERTIES OF A COMPUTING DEVICE

BACKGROUND

Computing devices are often used to execute searches for information. Some computing devices may perform "parameterless searches" as a way to automatically obtain search results that the computing device infers may be of interest to a user given a current context (e.g., time of day, geographic location, calendar appointment, etc.).

Despite sometimes obtaining relevant and useful information for a current context, the content associated with parameterless search results may not always be suitable for presentation by the computing device. For example, even if a computing device (e.g., a mobile phone, a watch, etc.) determines that a certain video stream is a particularly relevant search result for a current context, the computing device may annoy the user by providing the video stream as a relevant search result if the computing device is likely to have difficulty playing streaming videos (e.g., if the mobile computing device has a slow or unreliable network connection that does not meet streaming video requirements, etc.).

SUMMARY

In one example, the disclosure is directed to a method that includes executing, by the computing system, based at least in part on a context of a computing device, a parameterless search query to identify a plurality of search results determined to be relevant to a user of the computing device, determining, by the computing system, a respective target property, for each of the plurality of search results, wherein the respective target property indicates whether a search result is associated with audio content, visual content, audio and visual content, haptic content, or textual content, and determining, by the computing system, one or more dynamic properties of the computing device, the one or more dynamic properties indicating at least one of: network connection strength, connection status to an audio output device, battery level, or connection status to a multimedia streaming device. The method further includes determining, by the computing system, based on the one or more dynamic properties of the computing device and the respective target property of each of the plurality of search results, a dynamic ranking of the plurality of search results; and transmitting, by the computing system, to the computing device, the plurality of search results and the dynamic ranking.

In another example, the disclosure is directed to a computing system that includes at least one processor; and at least one module operable by the at least one processor to execute, based at least in part on a context of a computing device, a parameterless search query to identify a plurality of search results determined to be relevant to a user of the computing device, determine a respective target property, for each of the plurality of search results, wherein the respective target property indicates whether a search result is associated with audio content, visual content, audio and visual content, haptic content, or textual content, and determine one or more dynamic properties of the computing device, the one or more dynamic properties indicating at least one of: network connection strength, connection status to an audio output device, battery level, or connection status to a multimedia streaming device. The at least one module is further operable by the at least one processor to determine, based on the one or more dynamic properties of the computing device and the respective target property of each of the plurality of search results, a dynamic ranking of the plurality of search results, and transmit, to the computing device, the plurality of search results and the dynamic ranking.

In another example, the disclosure is directed to a computer-readable storage medium including instructions that, when executed, cause at least one processor of a computing system to execute, based at least in part on a context of a computing device, a parameterless search query to identify a plurality of search results determined to be relevant to a user of the computing device, determine a respective target property, for each of the plurality of search results, wherein the respective target property indicates whether a search result is associated with audio content, visual content, audio and visual content, haptic content, or textual content, and determine one or more dynamic properties of the computing device, the one or more dynamic properties indicating at least one of: network connection strength, connection status to an audio output device, battery level, or connection status to a multimedia streaming device. The instructions, when executed, further cause the at least one processor of the computing system to determine, based on the one or more dynamic properties of the computing device and the respective target property of each of the plurality of search results, a dynamic ranking of the plurality of search results, and transmit, to the computing device, the plurality of search results and the dynamic ranking.

The details of one or more examples are set forth in the accompanying drawings and the description below. Other features, objects, and advantages of the disclosure will be apparent from the description and drawings, and from the claims.

DETAILED DESCRIPTION

In general, techniques of this disclosure may enable a computing system to rank search results (e.g., parameterless search results) based on the dynamic properties of a computing device. As used herein, the term "parameterless search result" refers to a search result derived from a "parameterless search" which is defined as a search for information that does not rely on any user input parameters (e.g., search terms). Also sometimes referred to as a "zero input" search, a parameterless search, when executed, causes a computing system to perform a search for information that the computing system predicts will likely be of interest to a user of a computing device given a current context of computing device (e.g., time of day, geographic location, calendar appointments, etc.).

The described techniques may enable a computing system to assign a higher ranking to parameterless search results that are both relevant to the current context and point to types of content that is suitable for immediate presentation by the computing device in the current context. Conversely, the described techniques may enable the computing system to assign lower rankings to other parameterless search results that, despite being relevant to the current context, are associated with other types of content that would be better presented by a different computing device and/or in a different context.

Throughout the disclosure, examples are described where a computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

Figure 1:
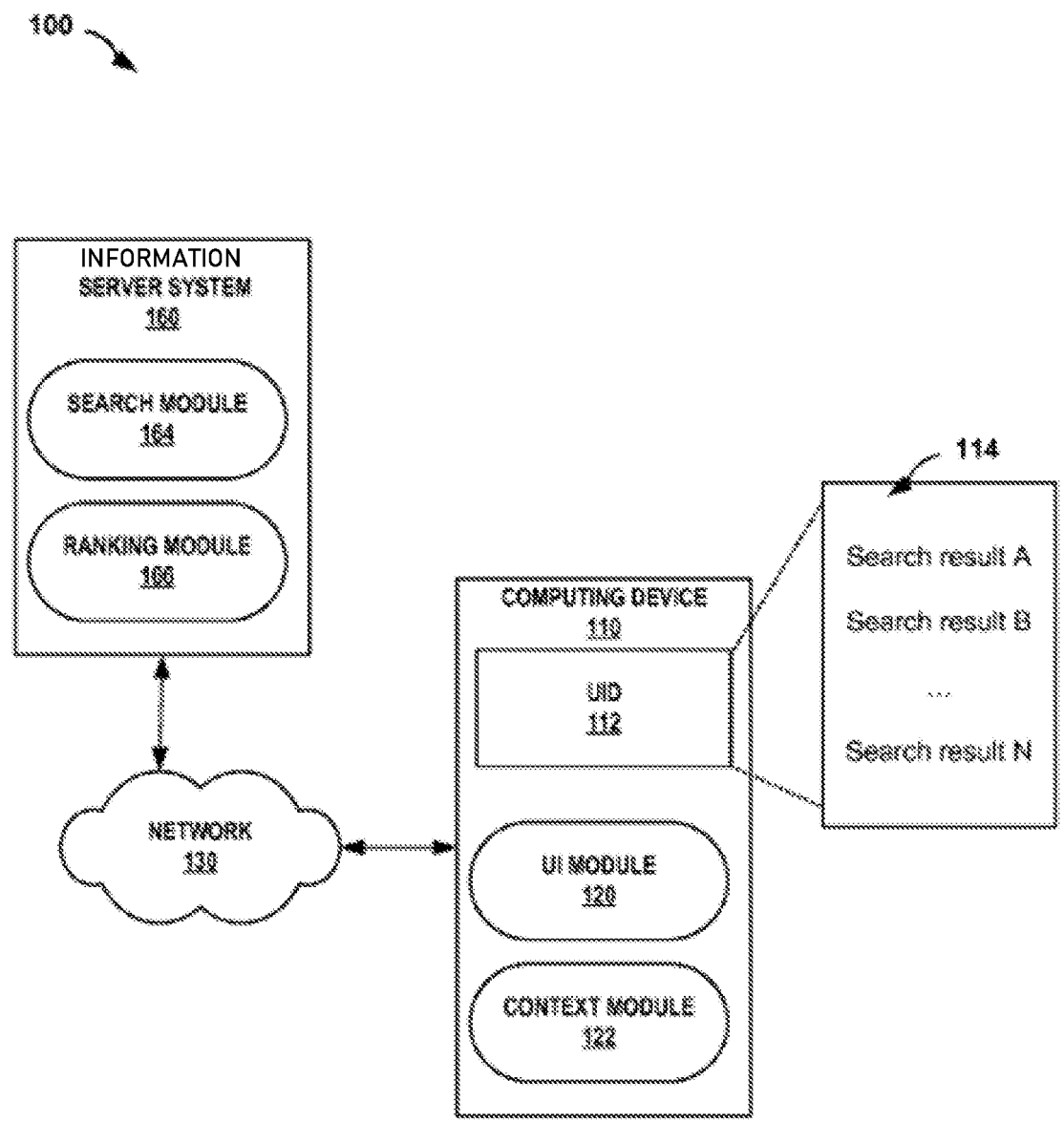
FIG. 1 is a conceptual diagram illustrating an example system for ranking parameterless search results based at least in part on dynamic properties of a computing device, in accordance with one or more aspects of the present disclosure.

FIG. 1 is a conceptual diagram illustrating system 100 as an example system for ranking parameterless search results based at least in part on dynamic properties of a computing device, in accordance with one or more aspects of the present disclosure. System 100 includes information server system ("ISS") 160 in communication with computing device 110 via network 130. Computing device 110 may communicate with ISS 160 via network 130 to provide ISS 160 with information that indicates a current context of computing device 110. ISS 160 may execute a parameterless search based on the current context of computing device 110 and output the search results as information that may be relevant for the current context. ISS 160 may further provide a ranking of the search results to enable computing device 110 to prioritize the search results when presenting the search results to a user of computing device 110.

Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between ISS 160 and computing device 110. Computing device 110 and ISS 160 may transmit and receive data across network 130 using any suitable communication techniques.

ISS 160 and computing device 110 may each be operatively coupled to network 130 using respective network links. The links coupling computing device 110 and ISS 160 to network 130 may be Ethernet or other types of network connections, and such connections may be wireless and/or wired connections.

Computing device 110 represents an individual mobile or non-mobile computing device. Examples of computing device 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or home assistant), a personal digital assistants (PDA), portable gaming systems, media players, e-book readers, mobile television platforms, automobile navigation and entertainment systems, or any other types of mobile, non-mobile, wearable, and non-wearable computing devices configured to receive information via a network, such as network 130.

Computing device 110 includes user interface device (UID) 112, user interface (UI) module 120, and context module 122. Modules 120-122 may perform operations described using software, hardware, firmware, or a mixture of hardware, software, and firmware residing in and/or executing at respective computing device 110. Computing device 110 may execute modules 120-122 with multiple processors or multiple devices. Computing device 110 may execute modules 120-122 as virtual machines executing on underlying hardware. Modules 120-122 may execute as one or more services of an operating system or computing platform. Modules 120-122 may execute as one or more executable programs at an application layer of a computing platform.

UID 112 of computing device 110 may function as an input and/or output device for computing device 110. UID 112 may be implemented using various technologies. For instance, UID 112 may function as an input device using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. In addition, UID 112 may include microphone technologies, infrared sensor technologies, or other input device technology for use in receiving user input.

UID 112 may function as output (e.g., display) device using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. In addition, UID 112 may include speaker technologies, haptic feedback technologies, or other output device technology for use in outputting information to a user.

UID 112 may each include respective presence-sensitive displays that may receive tactile input from a user of computing device 110. UID 112 may receive indications of tactile input by detecting one or more gestures from a user (e.g., the user touching or pointing to one or more locations of UID 112 with a finger or a stylus pen). UID 112 may present output to a user, for instance at respective presence-sensitive displays. UID 112 may present the output as a graphical user interface (e.g., user interface 114), which may be associated with functionality provided by computing device 110. For example, UID 112 may present various user interfaces (e.g., user interface 114) related to parameterless search functions provided by UI module 120 or other features of computing platforms, operating systems, applications, and/or services executing at or accessible from computing device 110 (e.g., electronic message applications, Internet browser applications, mobile or desktop operating systems, etc.).

UI module 120 may manage user interactions with UID 112 and other components of computing device 110 including interacting with ISS 160 so as to provide parameterless search results at UID 112. UI module 120 may cause UID 112 to output a user interface, such as user interface 114 (or other example user interfaces) for display, as a user of computing device 110 views output and/or provides input at UID 112. UI module 120 and UID 112 may receive one or more indications of input from a user as the user interacts with the user interface, at different times and when the user and computing device 110 are at different locations. UI module 120 and UID 112 may interpret inputs detected at UID 112 and may relay information about the inputs detected at UID 112 to one or more associated platforms, operating systems, applications, and/or services executing at computing device 110, for example, to cause computing device 110 to perform functions.

UI module 120 may receive information and instructions from one or more associated platforms, operating systems, applications, and/or services executing at computing device 110 and/or one or more remote computing systems, such as ISS 160. In addition, UI module 120 may act as an intermediary between the one or more associated platforms, operating systems, applications, and/or services executing at computing device 110, and various output devices of computing device 110 (e.g., speakers, LED indicators, audio or electrostatic haptic output device, etc.) to produce output (e.g., a graphic, a flash of light, a sound, a haptic response, etc.) with computing device 110.

In the example of FIG. 1, user interface 114 is a graphical user interface associated with a parameterless search service provided by ISS 160 and accessed by computing device 110. As shown in FIG. 1, user interface 114 includes multiple parameterless search results displayed in a ranked order from "Search result A"-"Search result N". As described in detail below, user interface 114 includes graphical information (e.g., text), which represents information that ISS 160 finds and infers that a user of computing device 110 may be interested in for a current context of computing device 110. User interface 114 may include various other types of graphical indications such as visual depictions of parameterless search results (e.g., lists, content cards, etc.), actual content associated with the parameterless search results (e.g., videos, images, text, etc.), and other information that a user of computing device 110 may be interested in for a current context. UI module 120 may cause UID 112 to output user interface 114 based on data UI module 120 receives via network 130 from ISS 160. UI module 120 may receive graphical information (e.g., text data, images data, etc.) for presenting user interface 114 as input from ISS 160 along with instructions from ISS 160 for presenting the graphical information within user interface 114 at UID 112.

Context module 122 may process and analyze contextual information associated with computing device 110 to define a context of computing device 110. As used throughout the disclosure, the term "contextual information" is used to describe any information that can be used by a computing system and/or computing device, such as ISS 160 and computing device 110, to define the virtual and/or physical operating conditions that a computing device, and the user of the computing device, may be experiencing at a particular time.

In determining a context of computing device 110, context module 122 may determine one or more characteristics associated with: computing device 110, the user of computing device 110, and the physical and/or virtual environment of computing device 110 and the user. As contextual information changes (e.g., based on sensor information indicative of movement over time), context module 122 may update the determined context of computing device 110. Context module 122 may transmit, over network 130, the current context of computing device 110 to ISS 160 and search module 164 may perform a parameterless search for information related to the context of computing device 110.

Examples of the one or more characteristics that context module 122 may determine about the physical and/or virtual environment of computing device 110 and the user include: location identifying characteristics (e.g., a name of an establishment, a building, a room within the building, a street address, a type of place, a coordinate location, an altitude, an elevation, and the like), weather conditions or forecasts (e.g., temperatures, wind speeds, humidity levels, cloud cover conditions, and the like), traffic conditions or forecasts, ambient light conditions, humidity levels, air pressure conditions, and any and all other information about the physical and/or virtual surroundings of computing device 110.

Examples of the one or more characteristics that context module 122 may determine about a user of computing device 110 include: calendar information, communication information (e.g., e-mail, text based messages, instant messages, and the like), purchase histories, content viewing histories (e.g., movies, TV shows, etc.), medication histories, Internet browsing histories, social media or social network information (e.g., friends, followers, articles, posts, and other social media or social network information), task lists, travel patterns, frequently visited locations, location histories, demographic information, device usage patterns, and any and all other information about the user of computing device 110.

Examples of the one or more characteristics that context module 122 may determine about computing device 110 include both static properties and dynamic properties. Static properties of computing device 110 may include: a device type (e.g., tablet, phone, wearable, etc.), screen size (e.g., dimensions, large or small, etc.), availability of various input and output devices (e.g., availability of a display device, availability of an audio device, availability of a microphone, availability of a keyboard, availability of a touch-input device, etc.), type of an operating system or a computing platform executing at the device, and any and all other properties about computing device 110 that are generally static and do not change.

Unlike static properties of computing device 110 that generally do not change, one or more characteristics that context module 122 may determine about computing device 110 include dynamic properties, or properties about computing device 110 that can and generally do change or vary overtime. Dynamic properties of computing device 110 may include: degrees of movement (e.g., orientation, trajectory, speed, direction, acceleration, etc.), magnitudes of change associated with the degrees of movement, patterns of movement, application usage (e.g., what types of applications are executing or have been executing, webpage addresses viewed at various locations and times, text entries made in data fields of the webpages viewed at various locations and times, and other application usage data associated with various locations and times), network connection type (e.g., wired, wireless, cellular, Wi-Fi, near-field communications, Bluetooth, etc.), network connection strength (e.g., bandwidth, speed, latency, etc.), battery level (e.g., full, percentage, etc.), and battery charging status (e.g., whether the battery is charging or not).

Dynamic properties of computing device 110 may also include information about: a connection status to an audio output device (e.g., whether or not headphones are connected, whether a car audio system is connected, whether a home audio system is connected, etc.), connection status to a multimedia streaming device (e.g., whether or not audio/video data is being output or can be output via a multimedia streaming device to an external display), and any and all other sensor information obtained by or about one or more sensors (e.g., gyroscopes, accelerometers, proximity sensors) of computing device 110, radio transmission information obtained by or about one or more communication units and/or radios (e.g., global positioning system (GPS), cellular, Wi-Fi) of computing device 110, information obtained by or about one or more input devices (e.g., cameras, microphones, keyboards, touchpads, mice) of computing device 110, information obtained by or about one or more input devices (e.g., cameras, microphones, keyboards, touchpads, mice) of computing device 110, and information obtained by or about one or more network devices (e.g., network/device identifier information, a network name, a device internet protocol address) of computing device 110. Dynamic properties of computing device 110 may also include information about audio and/or video streams accessed by the computing device at various locations and times, television or cable/satellite broadcasts accessed by the computing device at various locations and times, and information about other services accessed by the computing device at various locations and times.

In some examples, context module 122 may maintain past and future contextual histories associated with the user of computing device 110. Context module 122 may catalog and record previous contexts of computing device 110 at various locations and times in the past and from the previously recorded contexts, may project or infer future contexts of computing device 110 at various future locations and future times. Context module 122 may associate future days and future times with the recurring contexts of prior days and times, to build a future contextual history associated with the user of computing device 110.

For example, the information contained in a past contextual history of computing device 110 may indicate the location and network signal strength of the user during the user's typical work week as the user travels along a typical route to and from a work location to a home location. Based on the past contextual history, context module 162 may produce a future contextual history that includes information indicating expected locations and expected network signal strength of the user during a future work week that mirror the actual locations and network signal strengths recorded in the past contextual history.

ISS 160 represents any suitable remote computing system, such as one or more desktop computers, laptop computers, mainframes, servers, cloud computing systems, etc. capable of sending and receiving information both to and from a network, such as network 130. ISS 160 hosts (or at least provides access to) a parameterless search system for automatically providing information that may be relevant to a current context of computing device 110. Computing device 110 may communicate with ISS 160 via network 130 to access the search system provided by ISS 160. In some examples, ISS 160 represents cloud a computing system that provide access to the search systems as a service that is accessible via the cloud.

In the example of FIG. 1, ISS 160 includes search module 164 and ranking module 166. Together, modules 164 and 166 provide a parameterless search service accessible to computing device 110 and other computing devices connected to network 130 for automatically providing information that may be relevant to a current context of computing device 110. Modules 164 and 166 may perform operations described using software, hardware, firmware, or a mixture of hardware, software, and firmware residing in and/or executing at ISS 160. ISS 160 may execute modules 164 and 166 with multiple processors, multiple devices, as virtual machines executing on underlying hardware, or as one or more services of an operating system or computing platform. In some examples, modules 164 and 166 may execute as one or more executable programs at an application layer of a computing platform of ISS 160.

Search module 164 execute, based at least in part on a context of computing device 110, a parameterless search query to identify a plurality of search results determined to be relevant to a user of computing device 110. Said differently, search module 164 may obtain information that may be relevant to a user of computing device 110, for a current context of computing device 110.

Search module 164 may determine a context of computing device 110, generate a search query based on the context, and execute a search for information related to the search query. Search module 164 may use machine learning and/or other artificial intelligence techniques to learn and model user behavior, including what types of information that users of computing device 110 and other computing devices typically search for, in different contexts. Through learning and modeling searches of users for different contexts, search module 164 may generate one or more rules for automatically generating search queries that are likely to find information that a user of computing device 110 will want to obtain, for a particular context.

Search module 164 may conduct an Internet search based on the auto-generated search query to identify information related to the search query. After executing a search, search module 164 may output the information returned from the search (e.g., the parameterless search results) to ranking module 166 before sending the search results to computing device 110.

Ranking module 166 may rank the parameterless search results returned from search module 164 so that the search results which have content that is more suitable for presentation by computing device 110, for the current context, are ranked higher than the other search results that may point to content which is less suitable for presentation by computing device 110 in the current context. For example, ranking module 166 may assign a higher ranking to a search result that is associated with audio content when the current context indicates that computing device 110 is connected to a set of headphones. Conversely, ranking module 166 may assign a lower ranking to the same search result that is associated with the audio content when the current context indicates that computing device 110 is not connected to a set of headphones.

Ranking module 166 may use a rules based machine learning or artificial intelligence system to determine which search results have content that is best suited for the dynamic properties and/or static properties of computing device 110. For example, ranking module 166 may determine one or more dynamic properties of computing device 110 based on the current context of computing device 110. Ranking module 166 may input the one or more of the dynamic or static properties of computing device 110 into one or more rules, and receive as output from the one or more rules, a ranking of potential target properties that are typically associated with the parameterless search results. As some examples, the target properties of search results may indicate whether a search result is associated with audio content, visual content, audio and visual content, haptic content, or textual content. In any case, using the ranking of the various target properties, ranking module 166 may analyze the content associated with each of the plurality of parameterless search results to determine which search results have target properties which are best suited for presentation by computing device 110, given the current dynamic and/or static properties of computing device 110.

For instance, ranking module 166 may determine, based on the context from context module 122, that the one or more dynamic properties of computing device 110 indicate computing device 110 has a slow or unreliable network connection. Ranking module 166 may input the dynamic properties of computing device 110 into a rule, and in response, the rule may output an indication that text or still image content is most appropriate for the current context, followed by haptic content, audio content, video content, and lastly, audio and video content.

Accordingly, ranking module 166 may determine a dynamic ranking of the parameterless search results. The dynamic ranking may change as the context and/or dynamic properties of computing device 110 changes. Ranking module 166 may prioritize low bandwidth results in poor or low bandwidth network conditions and may prioritize high bandwidth results in good or high bandwidth network conditions.

For example, with a slow or unreliable network connection, ranking module 166 may rank the parameterless search results that are associated with text or still images higher than the parameterless search results that are associated with other types of content. If the dynamic properties associated with computing device 110 indicate that the network connection improves, ranking module 166 may adjust the ranking of the parameterless search results accordingly so that the search results that are associated with text or still images may not necessarily be ranked higher than the parameterless search results that are associated with other types of content.

Ranking module 166 may rank the parameterless search results based on other types of information as well. For example, ranking module 166 may supplement its rules for ranking parameterless search results with information derived from a user's search history (e.g., ranking parameterless search results higher that have content typically viewed across the user's search history since this is an indication that the user may prefer such results), past interaction with a user interface, such as user interface 114, when search results were presented (e.g., ranking parameterless search results higher that have content similar to what the user interacted with on prior occasions when presented with search results), as well as additional contextual information associated with the user and computing device 110.

In some examples, ranking module 166 may determine a dynamic ranking of the plurality of search results based not only on dynamic properties of computing device 110, but also based at least in part on the one or more static properties of computing device 110. For example, ranking module 166 may determine the dynamic ranking based also in part on a screen size, a device type, availability of a display device, availability of an audio device, or some other static property of computing device 110.

Ranking module 166 may output the parameterless search results and associated dynamic ranking to UI module 120 for formatting and presentation at UID 112. That is, ranking module 166 may transmit, via network 130 and to computing device 110, an indication (e.g., data representative) of the plurality of search results returned from the parameterless search and the dynamic ranking.

UI module 120 may present the parameterless search results according to the dynamic ranking received from ranking module 166. For example, UI module 120 may present higher ranking search results in the forefront of user interface 114, or at the top of a ranked list (e.g., as "Search result A"), and UI module 120 may present lower ranking search results in the background of user interface 114, or at the bottom of a ranked list (e.g., as "Search result N"). In this way, computing device 110 may more prominently present parameterless search results that are best suited for presentation by computing device 110, given the current context, than other search results that are not as well suited for presentation by computing device 110 in the current context.

Accordingly, computing device that accesses a parameterless search and ranking service as the one provided by the example computing system described herein, may not only automatically receive relevant and useful information for a current context, the information may be prearranged or formatted so that the content associated with higher ranking parameterless search results is also suitable for presentation by the computing device, in the current context.

By automatically ranking parameterless search results according to dynamic properties of the computing device so that the higher ranking results are more suitable for presentation by the computing device, given the current context, the user may spend less time trying to view content associated with results that is not suited or easily perceived in the current context. In addition, the user may provide fewer inputs cycling past results that have content which is not suitable for presentation given the current context, since the most suitable search results are presented at the forefront of all the results. With fewer inputs from a user, the example system may enable computing devices to conserve energy and use less battery power as compared to other systems that provide parameterless search results.

Figure 2:
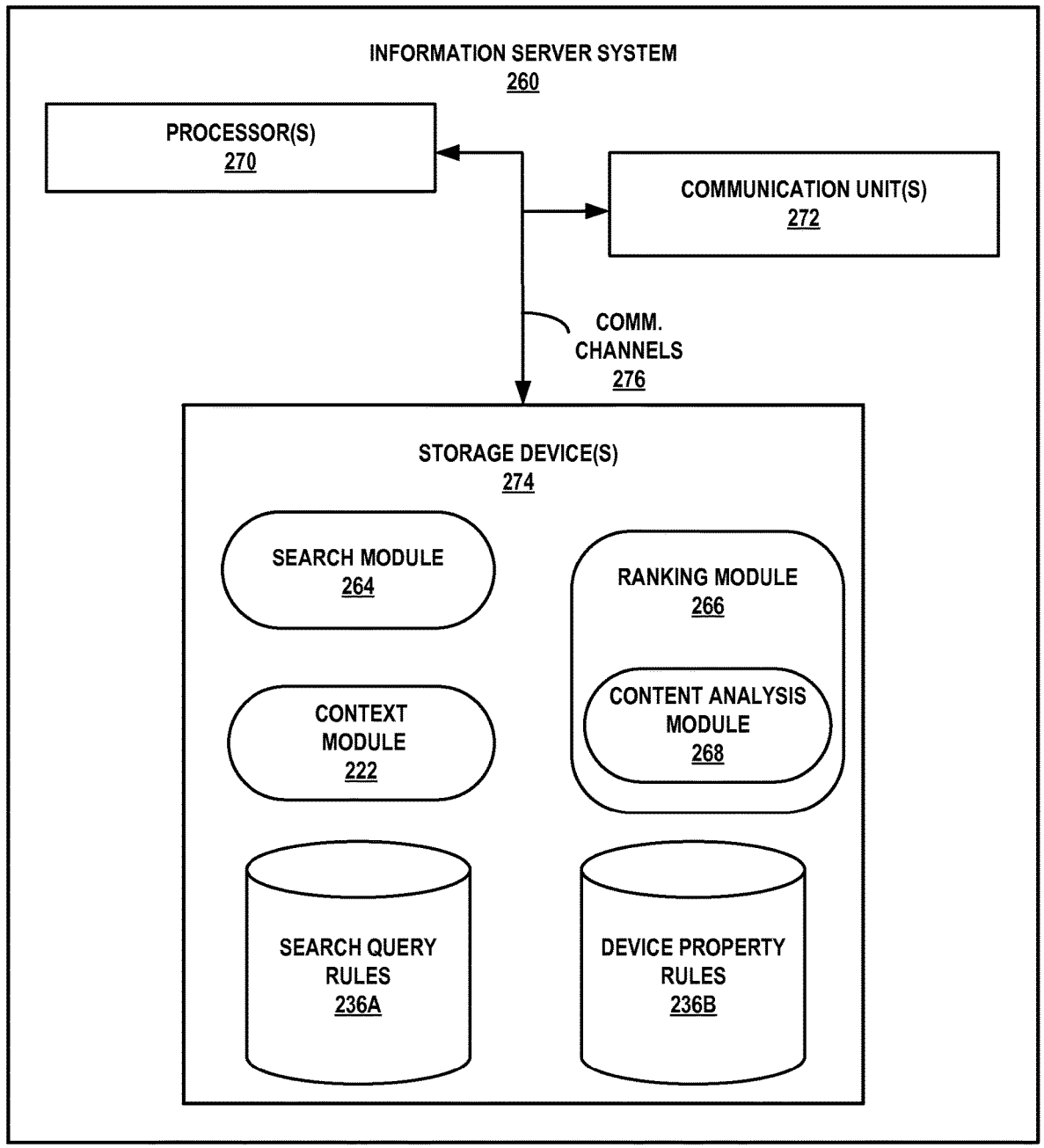
FIG. 2 is a block diagram illustrating an example computing system configured to rank parameterless search results based at least in part on dynamic properties of a computing device, in accordance with one or more aspects of the present disclosure.

FIG. 2 is a block diagram illustrating ISS 260 as an example computing system configured to rank parameterless search results based at least in part on dynamic properties of a computing device, in accordance with one or more aspects of the present disclosure. ISS 260 is a more detailed example of ISS 160 of FIG. 1 and is described below within the context of system 100 of FIG. 1. FIG. 2 illustrates only one particular example of ISS 260, and many other examples of ISS 260 may be used in other instances and may include a subset of the components included in example ISS 260 or may include additional components not shown in FIG. 2.

ISS 260 provides computing device 110 with a conduit through which a computing device, such as computing device 110, may access a parameterless search result service for automatically receiving information that is relevant for a current context of the computing device. As shown in the example of FIG. 2, ISS 260 includes one or more processors 270, one or more communication units 272, and one or more storage devices 274. Storage devices 274 of ISS 260 include context module 222, search module 264, and ranking module 266. Within ranking module 266, storage devices 274 includes content analysis module 268. Modules 222, 264, and 266 include at least the same, if not more, capability as, respectively, modules 122, 164 and 166 of FIG. 1.

Storage devices 274 of ISS 260 further includes search query rules data store 236A and device property rules data store 236B (collectively, "data stores 268"). Communication channels 276 may interconnect each of the components 270, 272, and 274 for inter-component communications (physically, communicatively, and/or operatively). In some examples, communication channels 276 may include a system bus, a network connection, an inter-process communication data structure, or any other method for communicating data.

One or more communication units 272 of ISS 260 may communicate with external computing devices, such as computing device 110 of FIG. 1, by transmitting and/or receiving network signals on one or more networks, such as network 130 of FIG. 1. For example, ISS 260 may use communication unit 272 to transmit and/or receive radio signals across network 130 to exchange information with computing device 110. Examples of communication unit 272 include a network interface card (e.g. such as an Ethernet card), an optical transceiver, a radio frequency transceiver, a GPS receiver, or any other type of device that can send and/or receive information. Other examples of communication units 272 may include short wave radios, cellular data radios, wireless Ethernet network radios, as well as universal serial bus (USB) controllers.

Storage devices 274 may store information for processing during operation of ISS 260 (e.g., ISS 260 may store data accessed by modules 222, 264, 266, and 268 during execution at ISS 260). In some examples, storage devices 274 are a temporary memory, meaning that a primary purpose of storage devices 274 is not long-term storage. Storage devices 274 on ISS 260 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 274, in some examples, also include one or more computer-readable storage media. Storage devices 274 may be configured to store larger amounts of information than volatile memory. Storage devices 274 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 274 may store program instructions and/or data associated with modules 222, 264, 266, and 268.

One or more processors 270 may implement functionality and/or execute instructions within ISS 260. For example, processors 270 on ISS 260 may receive and execute instructions stored by storage devices 274 that execute the functionality of modules 222, 264, 266, and 268. These instructions, when executed by processors 270, may cause ISS 260 to store information, within storage devices 274 during program execution. Processors 270 may execute instructions of modules 222, 264, 266, and 268 to execute parameterless searches and rank parameterless search results based at least in part on dynamic properties of the computing devices for which the parameterless search results are intended. That is, modules 222, 264, 266, and 268 may be operable by processors 270 to perform various actions or functions of ISS 260 which are described herein.

The information stored at data stores 268 may be searchable and/or categorized. For example, one or more modules 222, 264, 266, and 268 may provide input requesting information from one or more of data stores 268 and in response to the input, receive information stored at data stores 268. ISS 260 may provide access to the information stored at data stores 268 as a cloud based, data-access service to devices connected to network 130, such as computing device 110. When data stores 268 contain information associated with individual users or when the information is generalized across multiple users, all personally-identifiable-information such as name, address, telephone number, and/or e-mail address linking the information back to individual people may be removed before being stored at ISS 260. ISS 260 may further encrypt the information stored at data stores 268 to prevent access to any information stored therein. In addition, ISS 260 may only store information associated with users of computing devices if those users affirmatively consent to such collection of information. ISS 260 may further provide opportunities for users to withdraw consent and in which case, ISS 260 may cease collecting or otherwise retaining the information associated with that particular user.

Context module 222 may receive contextual information associated with computing device 110 via network 130, and similar to context module 122 of computing device 110, context module 222 may generate a context and contextual histories associated with computing device 110. That is, context module 222 may gather location information, sensor information, communication information, and any and all other information associated with computing device 110 to determine a context of computing device 110. For example, context module 222 may determine, based on communication information associated with the user of computing device 110 (e.g., e-mail, text messages, voice conversations, voicemails, video conversations, calendar information, etc.), the context of computing device 110.

Search module 264 may rely on the context determined by context module 222 to generate a query for a parameterless search. Ranking module 266 may rely on the context determined by context module 222 to rank the parameterless search results returned from a parameterless search.

In determining the context of computing device 110, context module 222 may determine dynamic properties of computing device 110, such as, a network connection strength, speed, or bandwidth, an indication of whether headphones, a wireless speaker, or a wired or wireless headset are connected to computing device 110, an indication of an amount of available battery storage, an indication of whether computing device 110 is charging its battery, and other dynamic properties of computing device 110. Context module 222 may also determine static properties of computing device 110, such as, screen size, device type, and an indication of the types of available input or output devices associated with computing device 110, and other static properties of computing device 110.

Data stores 268 may store rules of machine learning or artificial intelligence systems used by modules 222, 264, 266, and 268 to execute parameterless searches and rank parameterless search results in accordance with the techniques described herein. For example, data store 236A may store one or more rules accessed by search module 264 for generating a query based on a context associated with a computing device as determined by context module 222. For example, data store 236B may store one or more rules accessed by ranking module 266 for determining what target properties associated with search results, are best suited for the context associated with a computing device as determined by context module 222.

Data store 236A may receive as input a context and provide as output a parameterless search query for search module 164 to use in executing a parameterless search. For example, by inputting a current context of computing device 110 that indicates the user may be at a home location, in his or her living room, watching television, at a particular time of day, may cause a rule of data store 236A to output an indication of a search query with terms for finding television shows that may be of interest to the user. As another example, by inputting a current context of computing device 110 that indicates the user may be traveling to a foreign country, at a particular time of day when he or she normally eats lunch, may cause a rule of data store 236A to output an indication of a search query with terms for finding restaurants that may suit the taste buds of the user.

Data store 236B may receive as input one or more dynamic and/or static device properties as indicated in a current context of computing device 110, and provide as output respective scores of target properties associated with content as an indication of the most likely or least likely content that is suitable for presentation by computing device 110 for the current context. For example, inputting a current context of computing device 110, into data store 236B, that defines one or more dynamic properties of computing device 110 as indicating computing device 110 is connected to any audio output device (e.g., a wireless speaker, headphones, a car speaker system, a wired speaker, or other audio output device) may cause a rule of data store 236B to output an indication (e.g., a score, a percentage, a degree of likelihood, etc.) that audio content is a highest ranked target property or most suitable type of content to present given the current context over all other target properties and types of content. As another example, by inputting a current context of computing device 110, into data store 236B, that defines one or more dynamic properties of computing device 110 as indicating computing device 110 is not connected to any audio output device (e.g., a wireless speaker, headphones, a car speaker system, a wired speaker, or other audio output device) may cause a rule of data store 236B to output an indication (e.g., a score, a percentage, a degree of likelihood, etc.) that audio content is a lowest ranked target property or least suitable type of content to present given the current context over all other target properties and types of content.

As another example, by inputting a current context of computing device 110 into data store 236B that defines one or more dynamic properties of computing device 110 as indicating computing device 110 has a low network connection strength (e.g., below a dB threshold) or a low battery level (e.g., less than 100%, less than 10%, etc.) may cause a rule of data store 236B to output an indication that textual content is a highest ranked target property or most suitable type of content to present given the current context over all other target properties and types of content. As yet another example, by inputting a current context of computing device 110 into data store 236B that defines one or more dynamic properties of computing device 110 as indicating computing device 110 has a high network connection strength (e.g., above the dB threshold) or a high battery level (e.g., 100%, greater than 10%, etc.) may cause a rule of data store 236B to output an indication that haptic content or visual content is a highest ranked target property or most suitable type of content to present given the current context over all other target properties and types of content. And as one more example, by inputting a current context of computing device 110 into data store 236B that defines one or more dynamic properties of computing device 110 as indicating computing device 110 is connected to any audio output device and has a high network connection strength (e.g., above a dB threshold) or a high battery level (e.g., 100%, greater than 10%, etc.) may cause a rule of data store 236B to output an indication that audio and visual content is a highest ranked target property or most suitable type of content to present given the current context over all other target properties and types of content.

Content analysis module 268 of ranking module 266 may infer target properties of content associated with individual parameterless search results. Examples of target properties include content type (e.g., audio, textual, visual, haptic, audio and visual, etc.), touch target size (e.g., physical size of graphical elements presented as input locations at a touch-sensitive screen such as UID 112 of computing device 110), an indication of whether the content is mobile friendly or designed for non-mobile platforms, system requirements for presenting the content (e.g., amount of available memory, processor power requirements, operating system or computing platform type, etc.), size of the content (e.g., image size, amount of content or words on a page, etc.), network location (e.g., internal network location or external network location), and data size (e.g., file size, length, quantity of bytes, etc.), and other properties that define content.

Content analysis module 268 may determine or predict an "engagement time" score associated with the content of each of the parameterless search results. In other words, content analysis module 268 may predict an amount of time that a user is predicted to spend interacting with content of a search result. Content analysis module 268 may infer, based on the context of computing device 110 and other information learned overtime about a user of computing device 110 (e.g., communication information, usage habits, etc.) how long the user is expected to interact with (e.g., view, listen to, feel, etc.) the content of each of the parameterless search results. Content analysis module 268 may infer the engagement time of a piece of content based on other information as well, such as content type, content source, etc. As one example, content analysis module 268 may assign a larger engagement time score to a video stream of a movie that may interest the user, and may assign a smaller engagement time score to a video stream that is popular with the general public as a whole; that is, content analysis module 268 may infer that the user is predicted to spend more time watching a movie that he or she is really interested in rather than a movie that everyone is interested in.

Using content analysis module 268, ranking module 266 may predict, based on the one or more dynamic properties of the computing device and the respective target property of each of the plurality of search results, a respective engagement time associated with each of the plurality of search results, and rank each of the plurality of search results according to the respective engagement time. Before ranking the search results, ranking module 266 may adjust the engagement time score determined by content analysis module 268 for each of the plurality of search results. Ranking module 266 may adjust the predicted engagement time score that content analysis module 268 applies to each search result by an amount that is proportional to the cumulative respective scores of target properties associated with content. In other words, ranking module 266 may adjust the engagement time upward (e.g., increase the engagement time) if the target properties associated with the content have scores indicating that the content is suitable for presentation by computing device 110 for the current context. Conversely, ranking module 266 may adjust the engagement time downward (e.g., decrease the engagement time) if the target properties associated with the content have scores that in the aggregate, indicate the content is not suitable for presentation by computing device 110 for the current context.

Figure 3A:
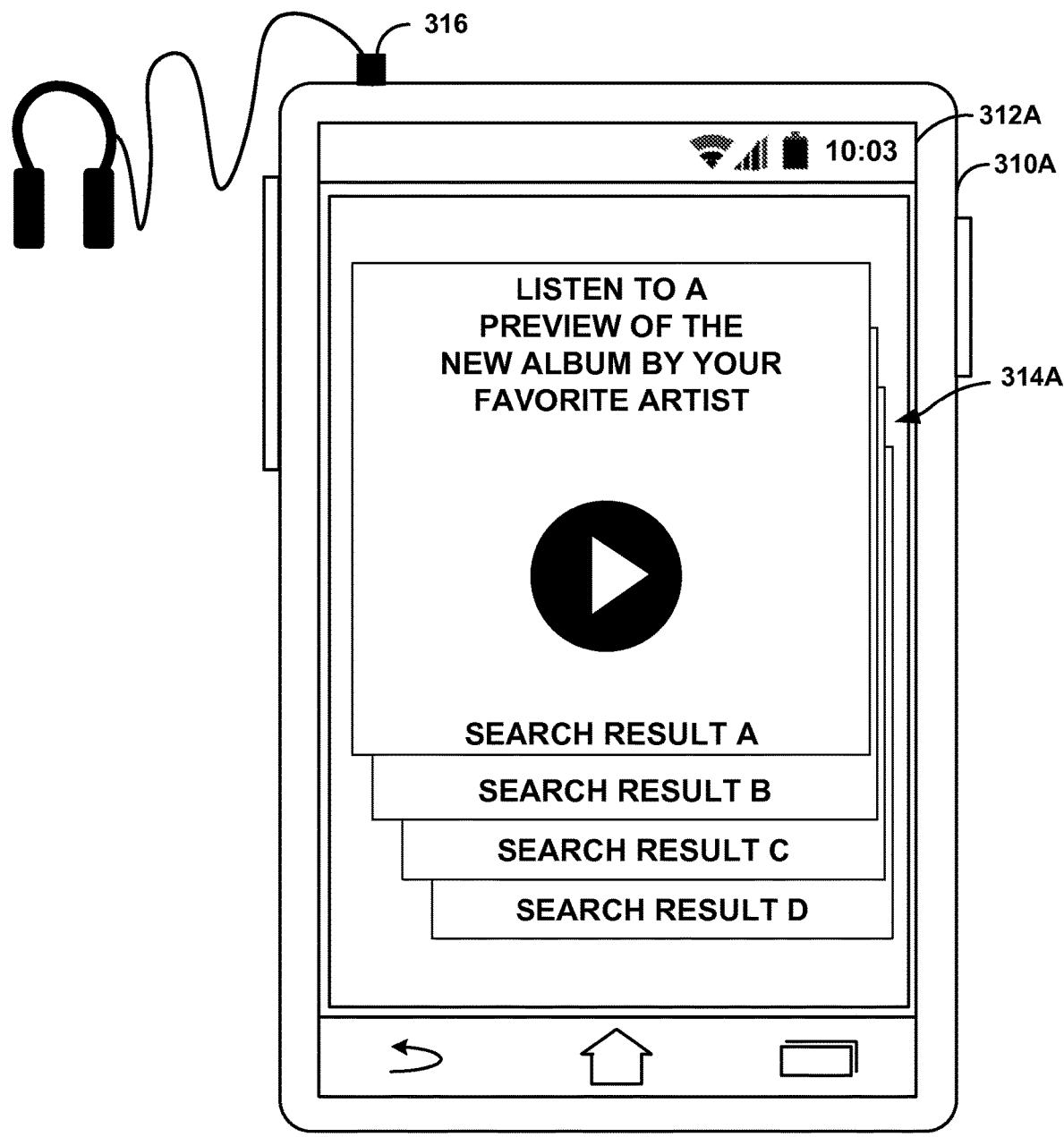
FIGS. 3A and 3B are conceptual diagrams illustrating example graphical user interfaces presented by example computing devices that are configured to present parameterless search results that have been ranked based at least in part on dynamic properties of the example computing devices, in accordance with one or more aspects of the present disclosure.
Figure 3B:
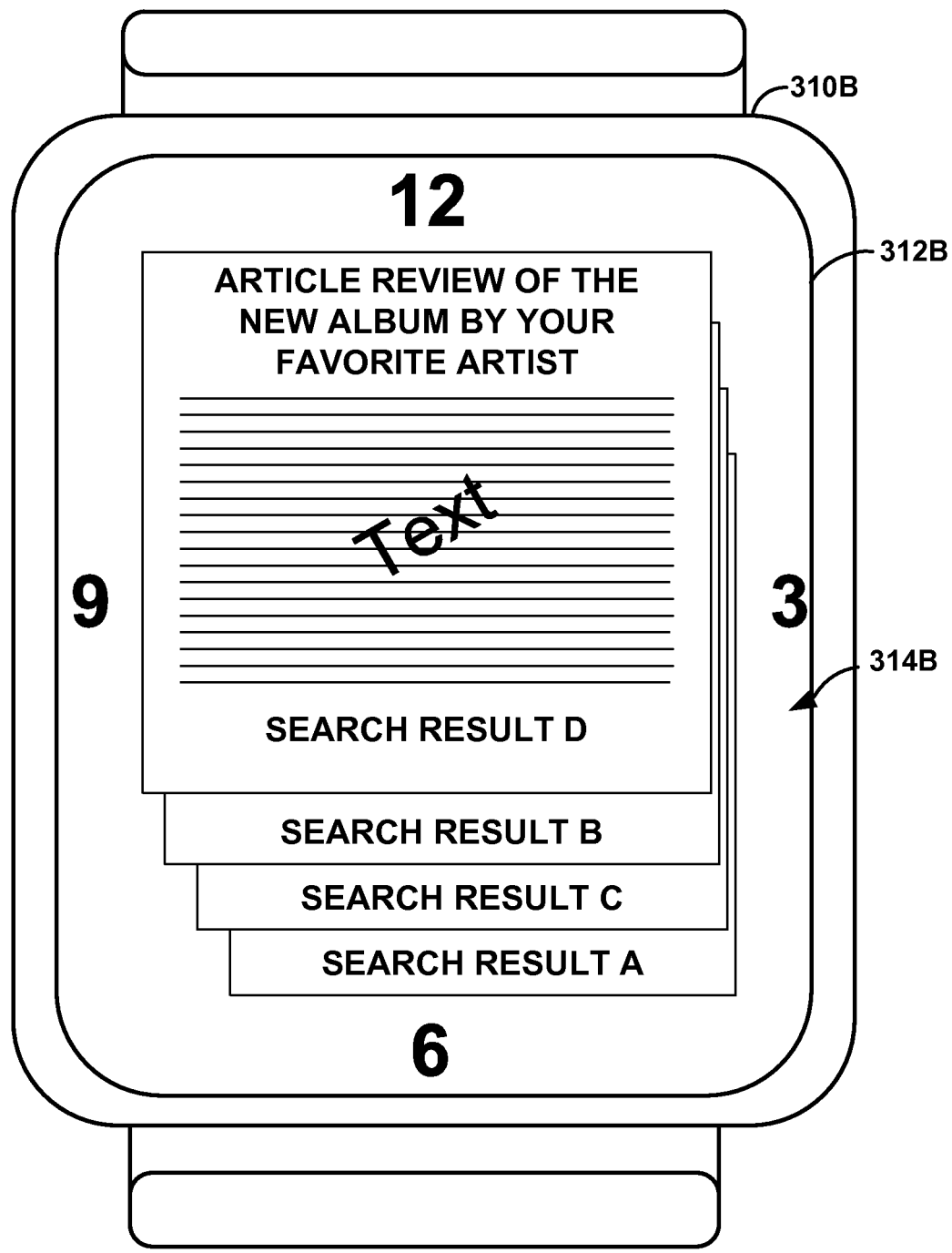

FIGS. 3A and 3B are conceptual diagrams illustrating example graphical user interfaces 314A and 314B presented, respectively, by computing devices 310A and 310B, as example computing devices that are configured to present parameterless search results that have been ranked based at least in part on dynamic properties of the example computing devices, in accordance with one or more aspects of the present disclosure. Computing devices 310A and 310B are examples of computing device 110 of system 100 of FIG. 1. FIGS. 3A and 3B are described below in the context of system 100 of FIG. 1.

In the example of FIG. 3A, computing device 310A is a mobile phone or a tablet device. Computing device 310A includes UID 312A which is configured to display user interface 314A. Also shown in the example of FIG. 3A, audio output device 316 (e.g., a pair of headphones) is connected to computing device 310A and available for outputting audio.

User interface 310A includes search results A-D presented in a dynamic ranking where the highest ranking search result in the example of FIG. 3A is search result A which is layered on top of the other search results (search results B-D). The lowest ranking search result in the dynamic ranking depicted in FIG. 3A is search result D which is associated with textual content or non-audio content. Search result A is associated with audio content.

When determining a dynamic ranking of search results A-D, ISS 160 may responsive to determining that the one or more dynamic properties indicate that computing device 310A is connected to any audio output device 316, rank, based on the respective target property of each of the plurality of search results, one or more search results from the plurality of search results that are associated with audio content higher in the dynamic ranking than the other search results from the plurality of search results. In other words, FIG. 3A shows that the dynamic ranking determined by ISS 160 may cause UI module 120 to present search results that are associated with audio content at the forefront of a graphical user interface (e.g., higher in the ranking) when headphones are connected to computing device 310A based on an inference that a user is more likely to want to listen to audio content when presumable wearing headphones. Although headphones are shown as one example of audio output device 316, other examples of audio output devices that could result in higher rankings for audio content include: wired or wireless speakers, car audio systems, and home audio systems. In some examples, ISS 160 may infer that a user is more likely to want to listen to audio content, and therefore present search results that are associated with audio content at the forefront of a graphical user interface based on other rules or conditions (e.g., in response to detecting a speaker phone setting of computing device 310A being enabled, or in response to detecting a volume setting associated with computing device 310A being set above a threshold volume setting, etc).

In the example of FIG. 3B, computing device 310B is a watch device. Computing device 310B includes UID 312B which is configured to display user interface 314B. Unlike computing device 310A, computing device 310B does not include audio output device 316 (e.g., a pair of headphones) connected to computing device 310B and available for outputting audio.

User interface 310B includes search results A-D presented in a dynamic ranking where the highest ranking search result in the example of FIG. 3B is search result D which is layered on top of the other search results (search results B, C, and A). The lowest ranking search result in the dynamic ranking depicted in FIG. 3A is search result A (e.g., the search result that is associated with audio content). Search result D is associated with textual content.

When determining a dynamic ranking of search results A-D, ISS 160 may responsive to determining that the one or more dynamic properties indicate that computing device 310B is not connected to any audio output device, rank, based on the respective target property of each of the plurality of search results, the other search results from the plurality of search results higher in the dynamic ranking than one or more search results from the plurality of search results that are associated with audio content. In other words, FIG. 3B shows that the dynamic ranking determined by ISS 160 may cause UI module 120 to present search results that are associated with non-audio content at the forefront of a graphical user interface (e.g., higher in the ranking) when headphones are not connected to computing device 310B based on an inference that a user is less likely to want to listen to audio content when an audio output device is not available. Other indications or dynamic properties that may indicate that the user does not want to listen to audio content may include a dynamic property indicating that device 310A is not coupled to a co-located wired or wireless speaker, not coupled to a co-located car audio system, having a speaker phone setting or volume setting set below a threshold volume setting, or turned-off, etc.

Figure 4:
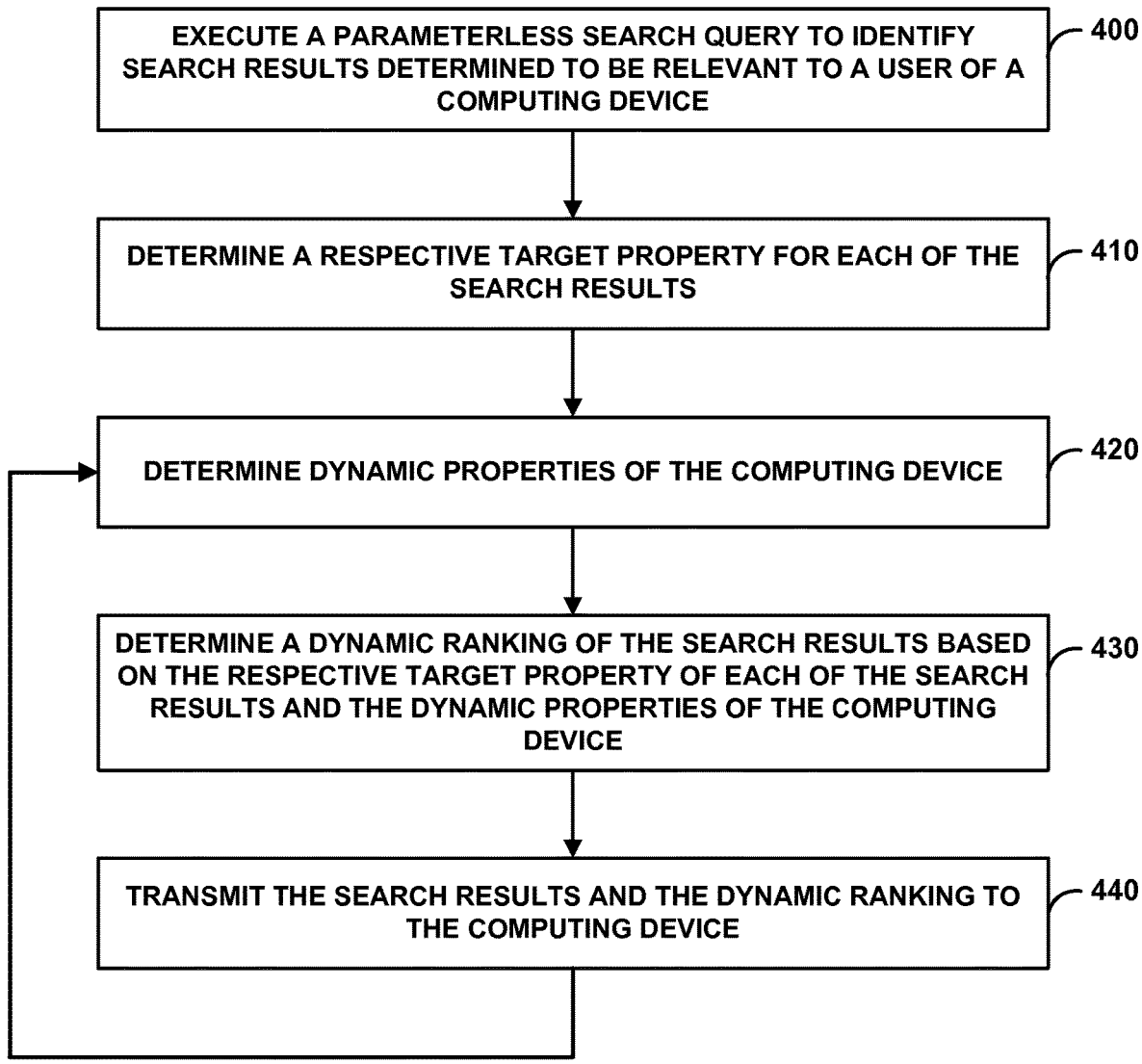
FIG. 4 is a flowchart illustrating example operations performed by an example computing system configured to rank parameterless search results based at least in part on dynamic properties of a computing device, in accordance with one or more aspects of the present disclosure.

FIG. 4 is a flowchart illustrating example operations 400-440 performed by an example computing system, such as ISS 260, which is configured to rank parameterless search results based at least in part on dynamic properties of a computing device, in accordance with one or more aspects of the present disclosure. FIG. 4 is described below in the context of system 100 of FIG. 1. For example, ISS 160 may perform operations 400-440, in accordance with one or more aspects of the present disclosure.

In the example of FIG. 4, ISS 160 may execute, based at least in part on a context of a computing device, a parameterless search query to identify a plurality of search results determined to be relevant to a user of the computing device (400). For example, search module 164 may receive a context of computing device 110 from context module 122, generate a parameterless search query that is likely to produce relevant information, for the current context, and generate parameterless search results by executing a search for information (e.g., on the Internet) using the generated query.

ISS 160 may determine a respective target property, for each of the plurality of search results (410). For instance, rather than merely output the search results to computing device 110 upon completion of the search, search module 164 may feed the search results as inputs to ranking module 166 to determine a dynamic ranking associated with the search results for improving the presentation of the search results at UID 112. Ranking module 166 may determine respective target properties of each of the search results, including at least one respective target property that indicates whether each search result is associated with audio content, visual content, audio and visual content, haptic content, or textual content.

ISS 160 may determine one or more dynamic properties of the computing device (420). For example, ranking module 166 may analyze the context received from context module 122 to determine dynamic properties that indicate at least one of: network connection strength, connection status to an audio output device, battery level, or connection status to a multimedia streaming device.

ISS 160 may determine, based on the one or more dynamic properties of the computing device and the respective target property of each of the plurality of search results, a dynamic ranking of the plurality of search results (430). For example, using a rules based algorithm or machine learning system, ranking module 166 may first analyze the content associated with each of the search results to determine a "predicted engagement time" associated with each result. The predicted engagement time being an estimated amount of time that a user of computing device 110 is expected to spend interacting with the content. In other parameterless search systems, the search results may be ranked only according to the predicted engagement times.

Next, ranking module 166 may determine "adjustments" to the predicted engagement times of each of the search results. Ranking module 166 may input the dynamic properties of computing device 110 and get out a score adjustment per target property type. For example, if a target property is compatible with the dynamic properties of computing device 110, the score adjustment may be zero. In other words, ranking module 166 may infer that the user is likely to be able to view, listen, or feel the content for as long as is expected given the current context of computing device 110. However, if a target property is not compatible with the dynamic properties of computing device 110 (e.g., indicating that content associated with that type of target property is not suitable for presentation in the current context), ranking module 166 may adjust the predicted engagement time of a search result by an that is greater than zero. In other words, ranking module 166 may infer that the user is not likely to be able to view, listen, or feel the content for as long as is expected given the current context of computing device 110 and will adjust the predicted engagement time accordingly.

Ranking module 166 may adjust each of the predicted engagement times of each of the search results, by decreasing the engagement times by the score adjustment. For example, assume a piece of content has an engagement time of one minute. Ranking module 166 may refrain from adjusting the engagement time if the target property associated with the content is compatible with the dynamic properties of computing device 110, therefore the adjusted engagement time will remain one minute. However, if the target property is incompatible with the dynamic properties of computing device 110, ranking module 166 may decrease the engagement time by some amount with a smaller decreases for target properties that are more compatible than other target properties that are less compatible with the current context.

Ranking module 166 may order the plurality of parameterless search results according to their respective adjusted engagement times. Ranking module 166 may assign search results with greater adjusted engagement times a higher ranking than search results with lesser adjusted engagement times.

ISS 160 may transmit, to the computing device, the plurality of search results and the dynamic ranking (440). For example, ranking module 166 may output the search results and the dynamic ranking via network 130 to computing device 110. UI module 120 may format the search results based on the dynamic ranking and present the search results to the user using UID 112.

As shown in FIG. 4, ISS 160 may repeat operations 420-440 as the dynamic properties change. For example, ISS 160 may determine an initial dynamic ranking of a plurality of parameterless search results based at least in part on initial dynamic properties of computing device 110 at an earlier time. Then, at a later time, ISS 160 may determine one or more subsequent dynamic properties of computing device 110 at least one of the one or more subsequent dynamic properties being different than each of the one or more initial dynamic properties. ISS 160 may determiner, based on the one or more subsequent dynamic properties of computing device 110 and the respective target property of each of the plurality of search results, a subsequent dynamic ranking of the plurality of search results that is different than the initial dynamic ranking ISS 160 may then transmit to computing device 110 the subsequent dynamic ranking Upon receiving the subsequent dynamic ranking from ISS 160, UI module 120 of computing device 110 may alter which search result is presented at the forefront of its user interface.

For example, ISS 160 may determine an initial dynamic ranking of search results where an audio file is ranked lower than a text or still image file because the dynamic properties of computing device 110 indicate than an audio output device (e.g., headphones) is not connected to computing device 110. Later, ISS 160 may determine a subsequent ranking of the search results where an audio file is ranked higher than the text or still image file because the dynamic properties of computing device 110 subsequently indicate than the audio output device (e.g., headphones) is connected to computing device 110.

In some examples, ISS 160 may determine the dynamic ranking of a plurality of search results by responsive to determining that the one or more dynamic properties indicate that the computing device has a low network connection strength or a low battery level, ranking, based on the respective target property of each of the plurality of search results, one or more search results from the plurality of search results that are associated with textual content higher in the dynamic ranking than the other search results from the plurality of search results. For example, if the dynamic properties of computing device 110 indicate that the network connection speed, bandwidth, latency, or other network characteristics cannot handle, and/or remaining battery power is not sufficient for presenting, certain types of elaborate content (e.g., audio, visual, audio and visual), then ranking module 166 may move the search results that are related to more elaborate content lower in the dynamic ranking and increase the position of the less elaborate content (e.g., textual content).

In some examples, ISS 160 may determine the dynamic ranking of a plurality of search results by responsive to determining that the one or more dynamic properties indicate that the computing device has a high network connection strength or a high battery level, ranking, based on the respective target property of each of the plurality of search results, one or more search results from the plurality of search results that are associated with haptic content or visual content higher in the dynamic ranking than the other search results from the plurality of search results. For example, if the dynamic properties of computing device 110 indicate that the network connection speed, bandwidth, latency, or other network characteristics can handle, and/or remaining battery power is sufficient for presenting, certain types of elaborate content, without audio playback, (e.g., visual, haptic, etc.), then ranking module 166 may move the search results that are related to more elaborate non-audio content higher in the dynamic ranking and decrease the position of the audio and the less elaborate content (e.g., textual content).

In some examples, ISS 160 may determine the dynamic ranking of a plurality of search results by responsive to determining that the one or more dynamic properties indicate that the computing device is connected to any audio output device and has a high network connection strength or a high battery level, ranking, based on the respective target property of each of the plurality of search results, one or more search results from the plurality of search results that are associated with audio and visual content higher in the dynamic ranking than the other search results from the plurality of search results. For example, if the dynamic properties of computing device 110 indicate that the network connection speed, bandwidth, latency, or other network characteristics can handle, and/or remaining battery power is sufficient for presenting, certain types of elaborate content, with audio playback, (e.g., audio, audio and visual, etc.), then ranking module 166 may move the search results that are related to more elaborate, audio content higher in the dynamic ranking and decrease the position of the non-audio and less elaborate content.

Accordingly, a system is described that in some examples, may learn to adjust a ranking of search results based on the device properties and the connectivity state of the user. In some examples, the system uses a cross-user model which predicts a discount factor to the "engagement time" that a given user will spend with a piece of content based on the content type (e.g., video, text, audio) and their device/connectivity level. Examples of device properties include static and dynamic properties. Examples of static properties include device type (e.g., tablet, phone, watch), screen size, input/output mechanism available. Examples of dynamic properties include connectivity level, whether headphones available, whether a streaming media device is available, battery level, and whether the device is a user's main device or a secondary device.

In some examples, the system predicts a score for each search result and ranks the search results according to the predicted score. For instance, the score may be determined based on the users search history, interaction with similar types of information, and the user context. The system may infer properties about the target content (e.g., mobile friendly or not, size of touch targets, expected load time on the devices, size of the target destination, processor and memory or other system requirements, amount of content on the page, number of characters in the main article, type of main media content being either audio, visual, audio/visual, size of images on the page, internal destinations, and type of information). The system may then machine learn a link between the score based on the device properties and the target properties.

For example, with regards to touch target size and image size, the system may infer that if due to the size of a touch target or an image size associated with a search result, a user would have difficulty engaging with the touch target or viewing an image (e.g., when presented at a small sized screen such as on a watch), then the system may give the result a lower ranking in amongst the other search results. Conversely, the system may infer that if due to the size of the touch target or an image size associated with the search result, the user would not have difficulty engaging with the touch target or viewing the image (e.g., when presented at a larger sized screen such as on a tablet), then the system may give the result a higher ranking, or refrain from altering the ranking, in amongst the other search results.

In some examples, with regards to network location associated with a search result, the system may infer that if a search result points to a location of content that is unavailable given a current network connection associated with a device thus making engagement with the content at least difficult (e.g., if the content is located behind a firewall or otherwise not accessible from a current network connection), then the system may give the result a lower ranking in amongst the other search results. Conversely, the system may infer that if a search result points to a location of content that is available given a current network connection associated with the device thus making engagement with the content possible (e.g., if the content is located behind a firewall but the current network connection of the device also gives the device access beyond the firewall), then the system may give the result a higher ranking, or refrain from altering the ranking, in amongst the other search results.

In some examples, with regards to data size associated with a search result, the system may infer that if a search result points to a larger size file that would take a long time to load given a current network connection, then the system may give the result a lower ranking in amongst the other search results. Conversely, the system may infer that if a search result points to a smaller size file, or if due to a fast network connection of the device, the system infer that would the result would not take a long time to load given the current network connection, then the system may give the result a higher ranking, or refrain from altering the ranking, in amongst the other search results.

In some examples, the system may personalize this score on a per-user basis. For example, it might be the case that some users only read long articles on their tablet, but like to watch TV shows when they are at home connected to their streaming device. The system will give higher scores to long articles when the user is using their tablet and higher scores to TV shows when at home and connected to the streaming device.

Clause 1. A method comprising: executing, by the computing system, based at least in part on a context of a computing device, a parameterless search query to identify a plurality of search results determined to be relevant to a user of the computing device; determining, by the computing system, a respective target property, for each of the plurality of search results, wherein the respective target property indicates whether a search result is associated with audio content, visual content, audio and visual content, haptic content, or textual content; determining, by the computing system, one or more dynamic properties of the computing device, the one or more dynamic properties indicating at least one of: network connection strength, connection status to an audio output device, battery level, or connection status to a multimedia streaming device; determining, by the computing system, based on the one or more dynamic properties of the computing device and the respective target property of each of the plurality of search results, a dynamic ranking of the plurality of search results; and transmitting, by the computing system, to the computing device, the plurality of search results and the dynamic ranking.

Clause 2. The method of clause 1, wherein: the one or more dynamic properties are initial dynamic properties; the dynamic ranking is an initial dynamic ranking; and the method further comprises: determining, by the computing system, one or more subsequent dynamic properties of the computing device, wherein at least one of the one or more subsequent dynamic properties is different than each of the one or more initial dynamic properties; determining, by the computing system, based on the one or more subsequent dynamic properties of the computing device and the respective target property of each of the plurality of search results, a subsequent dynamic ranking of the plurality of search results that is different than the initial dynamic ranking; transmitting, by the computing system, to the computing device, the subsequent dynamic ranking.

Clause 3. The method of any of clauses 1-2, further comprising: determining, by the computing system, one or more static properties of the computing device, the one or more static properties indicating at least one of: screen size, device type, availability of a display device, or availability of an audio device, wherein the dynamic ranking of the plurality of search results is further determined based at least in part on the one or more static properties of the computing device.

Clause 4. The method of any of clauses 1-3, wherein determining the dynamic ranking of the plurality of search results comprises: predicting, by the computing system, based on the one or more dynamic properties of the computing device and the respective target property of each of the plurality of search results, a respective engagement time associated with each of the plurality of search results, wherein the respective engagement time of a search result is an estimated amount of time that the user is predicted to spend interacting with content of that search result; and ranking, by the computing system, each of the plurality of search results according to the respective engagement time.

Clause 5. The method of any of clauses 1-4, wherein the respective target property of each of the plurality of search results further indicate at least one of: touch target size associated with that search result, image size associated with that search result, network location associated with that search result, and data size associated with that search result.

Clause 6. The method of any of clauses 1-5, further comprising: determining, by the computing system, based on communication information associated with the user of the computing device, the context of the computing device.

Clause 7. The method of any of clauses 1-6, wherein determining the dynamic ranking of the plurality of search results comprises: responsive to determining that the one or more dynamic properties indicate that the computing device is connected to any audio output device, ranking, by the computing system, based on the respective target property of each of the plurality of search results, one or more search results from the plurality of search results that are associated with audio content higher in the dynamic ranking than the other search results from the plurality of search results.

Clause 8. The method of clause 7, wherein determining the dynamic ranking of the plurality of search results comprises: responsive to determining that the one or more dynamic properties indicate that the computing device is not connected to any audio output device, ranking, by the computing system, based on the respective target property of each of the plurality of search results, the other search results from the plurality of search results higher in the dynamic ranking than one or more search results from the plurality of search results that are associated with audio content.

Clause 9. The method of any of clauses 1-8, wherein determining the dynamic ranking of the plurality of search results comprises: responsive to determining that the one or more dynamic properties indicate that the computing device has a low network connection strength or a low battery level, ranking, by the computing system, based on the respective target property of each of the plurality of search results, one or more search results from the plurality of search results that are associated with textual content higher in the dynamic ranking than the other search results from the plurality of search results.

Clause 10. The method of any of clauses 1-9, wherein determining the dynamic ranking of the plurality of search results comprises: responsive to determining that the one or more dynamic properties indicate that the computing device has a high network connection strength or a high battery level, ranking, by the computing system, based on the respective target property of each of the plurality of search results, one or more search results from the plurality of search results that are associated with haptic content or visual content higher in the dynamic ranking than the other search results from the plurality of search results.

Clause 11. The method of any of clauses 1-10, wherein determining the dynamic ranking of the plurality of search results comprises: responsive to determining that the one or more dynamic properties indicate that the computing device is connected to any audio output device and has a high network connection strength or a high battery level, ranking, by the computing system, based on the respective target property of each of the plurality of search results, one or more search results from the plurality of search results that are associated with audio and visual content higher in the dynamic ranking than the other search results from the plurality of search results.

Clause 12. A computer-readable storage medium comprising instructions that, when executed, cause at least one processor of a computing system to: execute, based at least in part on a context of a computing device, a parameterless search query to identify a plurality of search results determined to be relevant to a user of the computing device; determine a respective target property, for each of the plurality of search results, wherein the respective target property indicates whether a search result is associated with audio content, visual content, audio and visual content, haptic content, or textual content; determine one or more dynamic properties of the computing device, the one or more dynamic properties indicating at least one of: network connection strength, connection status to an audio output device, battery level, or connection status to a multimedia streaming device; determine, based on the one or more dynamic properties of the computing device and the respective target property of each of the plurality of search results, a dynamic ranking of the plurality of search results; and transmit, to the computing device, the plurality of search results and the dynamic ranking.

Clause 13. The computer-readable storage medium of any of clause 12, wherein: the one or more dynamic properties are initial dynamic properties; the dynamic ranking is an initial dynamic ranking; and the instructions, when executed, further cause the at least one processor of the computing system to: determine one or more subsequent dynamic properties of the computing device, wherein at least one of the one or more subsequent dynamic properties is different than each of the one or more initial dynamic properties; determine, based on the one or more subsequent dynamic properties of the computing and the respective target property of each of the plurality of search results, a subsequent dynamic ranking of the plurality of search results that is different than the initial dynamic ranking; transmit, to the computing device, the subsequent dynamic ranking.

Clause 14. The computer-readable storage medium of any of clauses 12-13, wherein: the instructions, when executed, further cause the at least one processor of the computing system to determine one or more static properties of the computing device, the one or more static properties indicating at least one of: screen size, device type, availability of a display device, or availability of an audio device; and the dynamic ranking of the plurality of search results is further determined based at least in part on the one or more static properties of the computing device.

Clause 15. The computer-readable storage medium of any of clauses 12-14, wherein the instructions, when executed, further cause the at least one processor of the computing system to: predict, based on the one or more dynamic properties of the computing device and the respective target property of each of the plurality of search results, a respective engagement time associated with each of the plurality of search results, wherein the respective engagement time of a search result is an estimated amount of time that the user is predicted to spend interacting with content of that search result; and rank each of the plurality of search results according to the respective engagement time.

Clause 16. The computer-readable storage medium of any of clauses 12-15, wherein the respective target property of each of the plurality of search results further indicate at least one of: touch target size associated with that search result, image size associated with that search result, network location associated with that search result, and data size associated with that search result.

Clause 17. A computing system comprising: at least one processor; at least one module operable by the at least one processor to: execute, based at least in part on a context of a computing device, a parameterless search query to identify a plurality of search results determined to be relevant to a user of the computing device; determine a respective target property, for each of the plurality of search results, wherein the respective target property indicates whether a search result is associated with audio content, visual content, audio and visual content, haptic content, or textual content; determine one or more dynamic properties of the computing device, the one or more dynamic properties indicating at least one of: network connection strength, connection status to an audio output device, battery level, or connection status to a multimedia streaming device; determine, based on the one or more dynamic properties of the computing device and the respective target property of each of the plurality of search results, a dynamic ranking of the plurality of search results; and transmit, to the computing device, the plurality of search results and the dynamic ranking.

Clause 18. The computing system of clause 17, wherein the at least one module is further operable by the at least one processor to determine the dynamic ranking of the plurality of search results by at least: responsive to determining that the one or more dynamic properties indicate that the computing device has a low network connection strength or a low battery level, ranking, based on the respective target property of each of the plurality of search results, one or more search results from the plurality of search results that are associated with textual content higher in the dynamic ranking than the other search results from the plurality of search results.

Clause 19. The computing system of any of clauses 17-18, wherein the at least one module is further operable by the at least one processor to determine the dynamic ranking of the plurality of search results by at least: responsive to determining that the one or more dynamic properties indicate that the computing device has a high network connection strength or a high battery level, rank, based on the respective target property of each of the plurality of search results, one or more search results from the plurality of search results that are associated with haptic content or visual content higher in the dynamic ranking than the other search results from the plurality of search results.

Clause 20. The computing system of any of clauses 17-19, wherein the at least one module is further operable by the at least one processor to determine the dynamic ranking of the plurality of search results by at least: responsive to determining that the one or more dynamic properties indicate that the computing device is connected to any audio output device and has a high network connection strength or a high battery level, rank, based on the respective target property of each of the plurality of search results, one or more search results from the plurality of search results that are associated with audio and visual content higher in the dynamic ranking than the other search results from the plurality of search results.

Clause 21. A computing system comprising means for performing any of the methods of clauses 1-11.

Clause 22. The computer-readable storage medium of clause 12, comprising further instructions that, when executed cause the at least one processor of the computing system to perform any of the methods of clauses 1-11.

Clause 23. The computing system of clause 17, comprising means for performing any of the methods of clauses 1-11.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method, comprising:
   determining, by a computing system, a context of a computing device based on contextual information associated with the computing device and/or a user of the computing device;
   subsequent to, and based on, determining the context of the computing device:
      initiating execution, by the computing system, of a parameterless search query to identify a plurality of search results determined to be relevant to the context of the computing device, wherein initiating execution of the parameterless search query is performed without a direct parameterless search request from the user to the computing device;
   determining, by the computing system, a respective target property, of each search result of the plurality of search results identified based on the parameterless search query, wherein the respective target property indicates whether the search result is associated with audio content, visual content, audio and visual content, haptic content, or textual content;
   determining, by the computing system and based on device characteristic data, one or more dynamic properties of the computing device, the one or more dynamic properties indicating at least one of: network connection strength, connection status to an audio output device, battery level, or connection status to a multimedia streaming device;
   determining, by the computing system, based on the one or more dynamic properties of the computing device and the respective target property of each search result of the plurality of search results, a dynamic ranking of the plurality of search results, wherein the dynamic ranking indicates presentation order of each search result of the plurality of search results; and
   transmitting, by the computing system, to the computing device, the plurality of search results and the dynamic ranking,
   wherein transmitting the plurality of search results and the dynamic ranking causes the computing device to provide each search result of the plurality of search results to the user according to the presentation order of each search result indicated by the dynamic ranking.

2. The method of claim 1, wherein:
   the one or more dynamic properties are one or more initial dynamic properties;
   the dynamic ranking is an initial dynamic ranking;
   and the method further comprises:
   determining, by the computing system, one or more subsequent dynamic properties of the computing device, wherein at least one of the one or more subsequent dynamic properties is different than each of the one or more initial dynamic properties;
   determining, by the computing system, based on the one or more subsequent dynamic properties of the computing device and the respective target property of each of the plurality of search results, a subsequent dynamic ranking of the plurality of search results that is different than the initial dynamic ranking; and
   transmitting, by the computing system, to the computing device, the subsequent dynamic ranking.

3. The method of claim 1, further comprising:
   determining rules for generating the dynamic ranking of the plurality of search results, wherein determining the rules for generating the dynamic ranking comprises determining information that characterizes past user actions completed on the computing device and another computing device.

4. The method of claim 3, wherein determining the rules for generating the dynamic ranking comprises correlating present contexts of user actions with past contexts of user actions.

5. The method of claim 1, further comprising:
   at a later time subsequent to causing the computing system to provide each search result of the plurality of search results to the user according to the presentation order of each search result indicated by the dynamic ranking:
      initiating execution, by the computing system and based at least in part on a different context of the computing device, of the parameterless search request to identify the plurality of search results,
      determining, by the computing system, one or more different dynamic properties of the computing device that are different from the one or more dynamic properties, the one or more different dynamic properties indicating at least one of: a different network connection strength, a different connection status to the audio output device, a different battery level, or a different connection status to the multimedia streaming device,
      determining, by the computing system, based on the one or more different dynamic properties of the computing device, a different dynamic ranking of the plurality of search results, and
      transmitting, by the computing system, to the computing device, the plurality of search results and the other dynamic ranking,
         wherein transmitting the plurality of search results and the different dynamic ranking to the computing device causes the computing device to provide each search result of the plurality of search results to the user according to a different presentation order of each search result indicated by the different dynamic ranking.

6. The method of claim 1, wherein the respective target property of each of the plurality of search results further indicate at least one of: touch target size associated with that search result, image size associated with that search result, network location associated with that search result, and data size associated with that search result.

7. The method of claim 1, wherein initiating execution of the parameterless search query to identify the plurality of search results includes determining, for the plurality of search results, values indicating relevance of corresponding content associated with the plurality of search results.

8. The method of claim 7, wherein the values are different from the dynamic ranking of the plurality of search results, and the dynamic ranking is determined subsequent to determining the values.

9. The method of claim 1, wherein determining the dynamic ranking of the plurality of search results comprises:
responsive to determining that the one or more dynamic properties indicate that the computing device has a low network connection strength or a low battery level, ranking, by the computing system, based on the respective target property of each of the plurality of search results, one or more search results from the plurality of search results that are associated with textual content higher in the dynamic ranking than other search results from the plurality of search results.

10. The method of claim 1, wherein determining the dynamic ranking of the plurality of search results comprises:
responsive to determining that the one or more dynamic properties indicate that the computing device has a high network connection strength or a high battery level, ranking, by the computing system, based on the respective target property of each of the plurality of search results, one or more search results from the plurality of search results that are associated with haptic content or visual content higher in the dynamic ranking than other search results from the plurality of search results.

11. The method of claim 1, wherein determining the dynamic ranking of the plurality of search results comprises:
responsive to determining that the one or more dynamic properties indicate that the computing device is connected to any audio output device and has a high network connection strength or a high battery level, ranking, by the computing system, based on the respective target property of each of the plurality of search results, one or more search results from the plurality of search results that are associated with audio and visual content higher in the dynamic ranking than the other search results from the plurality of search results.

12. A computer-readable storage medium, comprising instructions that, when executed, cause at least one processor of a computing system to:
determine a context of a computing device based on contextual information associated with the computing device and/or a user of the computing device;
initiate execution of a parameterless search query to identify a plurality of search results determined to be relevant to the context of the computing device, wherein initiating execution of the parameterless search query is performed without a direct parameterless search request from the user to an interface of the computing device;
determine a respective target property, of each search result of the plurality of search results identified based on the parameterless search query,
wherein the respective target property indicates whether the search result is associated with audio content, visual content, audio and visual content, haptic content, or textual content;
determine, based on device characteristic data, one or more dynamic properties of the computing device, the one or more dynamic properties indicating at least one of: network connection strength, connection status to an audio output device, battery level, or connection status to a multimedia streaming device;
determine, based on the one or more dynamic properties of the computing device and the respective target property of each search result of the plurality of search results, a dynamic ranking of the plurality of search results, wherein the dynamic ranking indicates presentation order of each search result within the plurality of search results; and
transmit, to the computing device, the plurality of search results and the dynamic ranking,
wherein transmitting the plurality of search results and the dynamic ranking to the computing device causes the computing device to provide each search result of the plurality of search results to the user according to the presentation order of each search result indicated by the dynamic ranking.

13. The computer-readable storage medium of claim 12, wherein:
the one or more dynamic properties are one or more initial dynamic properties;
the dynamic ranking is an initial dynamic ranking; and
the instructions, when executed, further cause the at least one processor of the computing system to:
determine one or more subsequent dynamic properties of the computing device, wherein at least one of the one or more subsequent dynamic properties is different than each of the one or more initial dynamic properties;
determine, based on the one or more subsequent dynamic properties of the computing device and the respective target property of each of the plurality of search results, a subsequent dynamic ranking of the plurality of search results that is different than the initial dynamic ranking; and
transmit, to the computing device, the subsequent dynamic ranking.

14. The computer-readable storage medium of claim 12, wherein the instructions, when executed, further cause the at least one processor of the computing system to determine one or more static properties of the computing device,
wherein the one or more static properties indicating at least one of: screen size, device type, availability of a display device, or availability of an audio device, and the dynamic ranking of the plurality of search results is further determined based at least in part on the one or more static properties of the computing device.

15. The computer-readable storage medium of claim 12, wherein the instructions, when executed, further cause the at least one processor of the computing system to:
predict, based on the one or more dynamic properties of the computing device and the respective target property of each of the plurality of search results, a respective engagement time associated with each of the plurality of search results, wherein the respective engagement time of a search result is an estimated amount of time that the user is predicted to spend interacting with content of that search result; and rank each of the plurality of search results according to the respective engagement time.

16. The computer-readable storage medium of claim 14, wherein the one or more dynamic properties of the computing device indicate the network connection strength of the computing device and the one or more static properties of the computing device indicate the device type of the computing device, and wherein the respective target property of each of the plurality of search results further indicate data size associated with each search result.

17. A computing system, comprising:

at least one processor; and at least one module operable by the at least one processor to:

determine a context of a computing device based on contextual information associated with the computing device and/or a user of the computing device;

initiating execution of a parameterless search query to identify a plurality of search results determined to be relevant to the context of the computing device wherein initiating execution of the parameterless search query is performed without a direct parameterless search request from the user to the computing device;

determine a respective target property, of each search result of the plurality of search results identified based on the parameterless search query, wherein the respective target property indicates whether the search result is associated with audio content, visual content, audio and visual content, haptic content, or textual content;

determine, based on device characteristic data, one or more dynamic properties of the computing device and one or more static properties of the computing device;

determine, based on the one or more dynamic properties of the computing device, the one or more static properties of the computing device, and the respective target property of each of the plurality of search results: a dynamic ranking of the plurality of search results, wherein the dynamic ranking indicates presentation order of each search result within the plurality of search results; and transmit, to the computing device, the plurality of search results and the dynamic ranking, and wherein transmitting the plurality of search results and the dynamic ranking to the computing device causes the computing device to provide each search result of the plurality of search results to the user according to the presentation order of each search result indicated by the dynamic ranking.

18. The computing system of claim 17, wherein the at least one module is further operable by the at least one processor to determine the dynamic ranking of the plurality of search results by at least:

responsive to determining that the one or more dynamic properties indicate that the computing device has a low network connection strength or a low battery level, and that the one or more static properties indicate a device type of the computing device:

ranking, based on the respective target property of each of the plurality of search results, one or more search results from the plurality of search results that are associated with textual content higher in the dynamic ranking than other search results from the plurality of search results.

19. The computing system of claim 17, wherein the at least one module is further operable by the at least one processor to determine the dynamic ranking of the plurality of search results by at least:

responsive to determining that the one or more dynamic properties indicate that the computing device has a high network connection strength or a high battery level, and that the one or more static properties indicate that computing device includes a display device:

rank, based on the respective target property of each of the plurality of search results, one or more search results from the plurality of search results that are associated visual content higher in the dynamic ranking than other search results from the plurality of search results.

20. The method of claim 1, wherein the one or more dynamic properties indicate a connection status of a connection between the computing device and the multimedia streaming device.

* * * * *